(12) United States Patent
Choi

(10) Patent No.: US 11,485,372 B2
(45) Date of Patent: Nov. 1, 2022

(54) STANDALONE-TYPE REAR WHEEL STEERING CONTROL APPARATUS AND METHOD THEREOF

(71) Applicant: HYUNDAI MOBIS CO., LTD., Seoul (KR)

(72) Inventor: Moon Cheon Choi, Uiwang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 855 days.

(21) Appl. No.: 16/381,652

(22) Filed: Apr. 11, 2019

(65) Prior Publication Data

US 2019/0315371 A1    Oct. 17, 2019

(30) Foreign Application Priority Data

Apr. 12, 2018 (KR) .................. 10-2018-0042551

(51) Int. Cl.
*B60W 50/00* (2006.01)

(52) U.S. Cl.
CPC ..... *B60W 50/00* (2013.01); *B60W 2050/0001* (2013.01)

(58) Field of Classification Search
CPC .................. B62D 7/159; B62D 6/002; B60W 2050/0001
See application file for complete search history.

(56) References Cited

U.S. PATENT DOCUMENTS

| 5,392,214 A | * | 2/1995 | Momose | B62D 7/159 706/900 |
| 2010/0332083 A1 | * | 12/2010 | Yanagi | B62D 7/159 701/42 |
| 2011/0035113 A1 | * | 2/2011 | Yanagi | B62D 7/146 701/42 |
| 2016/0023679 A1 | * | 1/2016 | Matsuoka | B62D 17/00 74/471 R |
| 2016/0362133 A1 | * | 12/2016 | Auden | B62D 7/159 |
| 2017/0144653 A1 | * | 5/2017 | Liu | B60W 30/045 |

FOREIGN PATENT DOCUMENTS

| JP | 2010234820 A | * | 10/2010 | |
| KR | 20090100846 A | * | 9/2009 | B60W 30/02 |
| KR | 10-2013-0053699 A | | 5/2013 | |

* cited by examiner

*Primary Examiner* — Jeff A Burke
*Assistant Examiner* — Jerrod Irvin Davis
(74) *Attorney, Agent, or Firm* — NSIP Law

(57) ABSTRACT

Disclosed herein is an apparatus for controlling standalone-type rear wheel steering (RWS), which includes a vehicle speed detection unit for detecting a vehicle speed by communicating with a sensor installed in a vehicle or an Electronic Control Unit (ECU); a steering angle and steering angular velocity detection unit for detecting steering angles and steering angular velocities of front and rear wheels by communicating with a sensor installed in the vehicle or the ECU; a master cylinder pressure detection unit for detecting a master cylinder pressure by communicating with a sensor installed in the vehicle or the ECU; and a controller for determining braking or turning of the vehicle using the information detected using the sensors or received from the ECU, calculating the amount of toe-in when the vehicle is braking or calculating a rear wheel steering angle when the vehicle is turning, and controlling the RWS based thereon.

12 Claims, 8 Drawing Sheets

STANDALONE-TYPE REAR WHEEL STEERING CONTROL APPARATUS AND METHOD THEREOF

CROSS-REFERENCES TO RELATED APPLICATIONS

The present application claims priority to Korean application number 10-2018-0042551, filed on Apr. 12, 2018, which is incorporated by reference in its entirety.

BACKGROUND OF THE INVENTION

The present invention relates to an apparatus and method for controlling standalone-type rear wheel steering, and more particularly, to an apparatus and method for controlling standalone-type rear wheel steering, which improve the straight-ahead driving stability of a vehicle at the time of braking by moving lateral force at rear wheels in an inward direction through toe-in control of both left and right rear wheels when the vehicle is braking while driving straight ahead, and which improve the turning stability and follow-up performance of the vehicle by changing rear wheels so as to have the same phase or a reverse phase relative to the direction of front wheels depending on a driving state detected using a sensor when the vehicle is turning.

In general, Rear Wheel Steering (RWS) of a vehicle, in which hydraulic equipment, a motor, and a decelerator are installed, serves to steer the rear wheels of the vehicle depending on the driving state of the vehicle.

Generally, RWS operates with the purpose of decreasing a radius of rotation when a vehicle drives at a low speed and with the purpose of improving driving stability when the vehicle drives at a high speed. That is, when the vehicle drives at a low speed, a rear wheel steering angle is controlled in an opposite direction from a front wheel steering angle, but when the vehicle drives at a high speed, the rear wheel steering angle is controlled in the same direction as the front wheel steering angle.

Research is actively performed on RWS. Existing vehicles and integrated RWS systems do not arbitrarily change the angles of rear wheel tires when a vehicle is braking while driving straight ahead. Accordingly, when a driver is braking the existing vehicle (namely, the vehicle in which RWS is not applied) by applying a brake while the vehicle is driven straight ahead, the vehicle may shake due to the imbalance between left and right sides. Also, although the integrated RWS minimizes the interference in an actuator when a vehicle is braking while driving straight ahead, the vehicle may shake.

Also, because the existing integrated RWS steers rear wheels in an opposite direction from front wheels when a vehicle drives at a low speed, for example, when the vehicle is parking or turning around, the trajectory of the rear end of the vehicle is formed further than the side of the vehicle. Accordingly, when there is an obstacle (e.g., a wall, curb, another vehicle, or the like) near the side of the vehicle, there may be a collision therewith during the turn of the vehicle.

Therefore, required is a method for improving the straight-ahead driving stability of a vehicle when the vehicle is braking while driving straight ahead and for improving the turning stability and follow-up performance of the vehicle by changing rear wheels so as to have the same phase or a reverse phase relative to the direction of front wheels (that is, by separately controlling the direction of the rear wheels regardless of the direction of the front wheels) when the vehicle is turning.

The related art of the present invention is disclosed in Korean Patent Application Publication No. 10-2013-0053699 published on May 24, 2013 and entitled "Control method for rear wheel steering".

SUMMARY OF THE INVENTION

According to one aspect of the present invention, the present invention has been made in an effort to solve the above problems, and embodiments of the present invention are directed to an apparatus and method for controlling standalone-type rear wheel steering, which may improve the straight-ahead driving stability of a vehicle at the time of braking by moving lateral force at rear wheels in an inward direction through toe-in control of left and right rear wheels when the vehicle is braking while driving straight ahead, and which may improve the turning stability and follow-up performance of the vehicle by changing rear wheels so as to have the same phase or a reverse phase relative to the direction of front wheels depending on a driving state detected using a sensor when the vehicle is turning.

An apparatus for controlling standalone-type rear wheel steering according to one aspect of the present invention may include a vehicle speed detection unit configured to detect a vehicle speed by communicating with a sensor installed in a vehicle or with an Electronic Control Unit (ECU); a steering angle and steering angular velocity detection unit configured to detect the steering angles and the steering angular velocities of the front wheel and the rear wheel of the vehicle by communicating with a sensor installed in the vehicle or with the ECU; a master cylinder pressure detection unit configured to detect a master cylinder pressure by communicating with a sensor installed in the vehicle or with the ECU; and a controller configured to determine braking or turning of the vehicle using pieces of information detected by itself using at least one of the sensors or delivered from the ECU, to calculate the amount of toe-in when the vehicle is braking or calculate a rear wheel steering angle when the vehicle is turning, and to control rear wheel steering depending on the calculated amount of toe-in or the calculated rear wheel steering angle.

In the present invention, the apparatus may be configured to perform toe-in control by applying separate control inputs for left rear wheel steering control and right rear wheel steering control in order to improve the straight-ahead driving stability of the vehicle when the vehicle is braking while driving straight ahead.

A control method of an apparatus for controlling standalone-type rear wheel steering according to another aspect of the present invention may include detecting, by the controller of the apparatus for controlling the standalone-type rear wheel steering, data that is necessary in order to estimate a vehicle state, to compensate for a yaw rate, and to determine whether the vehicle is driving straight ahead or turning; estimating, by the controller, the vehicle state using the detected data; determining, by the controller, the current driving state of the vehicle based on the estimated vehicle state; calculating, by the controller, a rear wheel steering angle to be controlled in response to turning when it is determined that the vehicle is turning as the result of determination of the current driving state of the vehicle; performing, by the controller, same phase control or reverse phase control in order to determine the direction of rear wheels after the rear wheel steering angle is determined; determining, by the controller, whether the vehicle is braking while driving straight ahead when it is determined that the current driving state of the vehicle does not correspond to turning; and calculating, by the controller, the amount of toe-in when it is determined that the current driving state of the vehicle corresponds to braking while driving straight ahead.

In the present invention, the control method may further include determining, by the controller, steering angle control inputs of both left and right rear wheels to be 0 degrees when it is determined that the vehicle is driving straight ahead without braking.

In the present invention, the data that is necessary in order to compensate for the yaw rate and determine whether the vehicle is driving straight ahead or turning may include at least one of the steering angles and the steering angular velocities of a front wheel and a rear wheel, the wheel speed, the yaw rate, and lateral acceleration data.

In the present invention, the vehicle state estimated by the controller may include at least one of the longitudinal speed, the lateral speed, the side slip angle, the yaw rate, and the lateral acceleration of the vehicle.

In the present invention, in order to determine whether the vehicle is turning, the controller may determine whether a steering angular velocity and a steering angle satisfy preset AND conditions in which the steering angle falls within a preset range ($-\alpha<$steering angle$<\alpha$) and in which the steering angular velocity is less than a preset value $\beta$ (steering angular velocity$<\beta$).

In the present invention, in order to calculate the rear wheel steering angle in response to the turning of the vehicle, the controller may calculate the rear wheel steering angle that is currently required in the vehicle by applying the longitudinal speed of the vehicle, a front wheel steering angle, and a vehicle-specific value, which are previously estimated, to a rear wheel steering model. Here, the vehicle-specific value may include at least one of a mass of the vehicle, a cornering stiffness, a distance from a center of mass of the vehicle to a tire base, and a side slip angle, and the rear wheel steering model may be an equation that is preset in order to calculate the rear wheel steering angle.

In the present invention, the same phase control may be configured to perform control such that the front wheel steering angle and the rear wheel steering angle of the vehicle are in the same direction, and the reverse phase control is configured to perform control such that the front wheel steering angle and the rear wheel steering angle are in opposite directions.

In the present invention, whether to perform the same phase control and the reverse phase control may be determined based on a preset vehicle speed.

In the present invention, in order to determine whether the vehicle is braking, the controller may detect a master cylinder pressure, generated when a brake is applied, and determine that the vehicle is braking when the master cylinder pressure is greater than a preset reference value ($\varepsilon$) or when any one vehicle posture control device is involved.

In the present invention, when it is determined that the vehicle is braking, the controller may determine the amount of toe-in using a lookup table that is preset based on a master cylinder pressure generated when a brake is applied and on vehicle speed information.

DESCRIPTION OF SPECIFIC EMBODIMENTS

Figure 1:
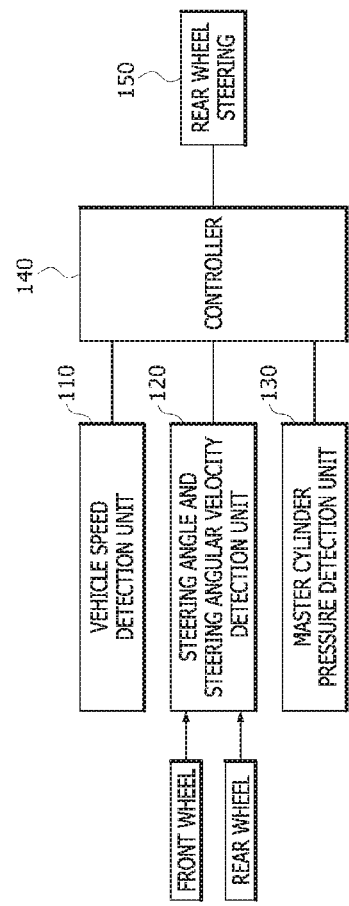
FIG. 1 is an exemplary view illustrating the schematic configuration of an apparatus for controlling standalone-type rear wheel steering in accordance with an embodiment of the present invention.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and method for controlling standalone-type rear wheel steering in accordance with an embodiment of the invention will be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 is an exemplary view illustrating the schematic configuration of an apparatus for controlling standalone-type rear wheel steering in accordance with an embodiment of the present invention.

As shown in FIG. 1, the apparatus for controlling standalone-type rear wheel steering in accordance with the present embodiment includes a vehicle speed detection unit 110, a steering angle and steering angular velocity detection unit 120, a master cylinder pressure detection unit 130, a controller 140, and Rear Wheel Steering (RWS) 150.

The vehicle speed detection unit 110 detects a vehicle speed by communicating with a sensor installed in a vehicle (e.g., a vehicle speed detection sensor) (not illustrated) or with an Electronic Control Unit (ECU) (not illustrated).

The steering angle and steering angular velocity detection unit 120 detects the steering angles and the steering angular velocities of the front wheel and the rear wheel of the vehicle by communicating with a sensor installed in the vehicle (e.g., a steering angle detection sensor) (not illustrated) or with the ECU (not illustrated).

The master cylinder pressure detection unit 130 detects a master cylinder pressure by communicating with a sensor installed in the vehicle (e.g., a cylinder pressure detection sensor) (not illustrated) or with the ECU (not illustrated).

The controller 140 communicates with the ECU (not illustrated), thereby receiving vehicle information that is required in addition to the information detected by the respective detection units 110 to 130.

Also, using the pieces of information detected using at least one of the sensors or received from the ECU (not illustrated), the controller 140 determines braking or turning of the vehicle, calculates the amount of toe-in when the vehicle is braking, and calculates a rear wheel steering angle when the vehicle is turning.

Also, the controller 140 controls the RWS 150 depending on the calculated amount of toe-in or the calculated rear wheel steering angle.

Generally, the existing integrated RWS system is not able to arbitrarily change the toe angles of rear wheel tires when a vehicle is driving straight ahead or turning, and when the vehicle is turning, the turning behavior thereof is determined depending on tire cornering stiffness that is set based on the vehicle speed and the turning radius.

However, the apparatus for controlling RWS (or a stand-alone-type RWS system) according to the present embodiment performs toe-in control by adjusting the toe angles of rear wheel tires when the vehicle is braking while driving straight ahead, thereby improving the straight-ahead driving stability of the vehicle. Also, when the vehicle is turning, the apparatus for controlling RWS according to the present embodiment changes the tire cornering stiffness of the vehicle by adjusting the toe angles of the rear wheel tires depending on the driving state determined based on the information detected using sensors, thereby improving follow-up performance at a low speed and improving turning stability at a high speed.

Hereinafter, the operation of the controller 140 will be more specifically described with reference to FIG. 2.

Figure 2:
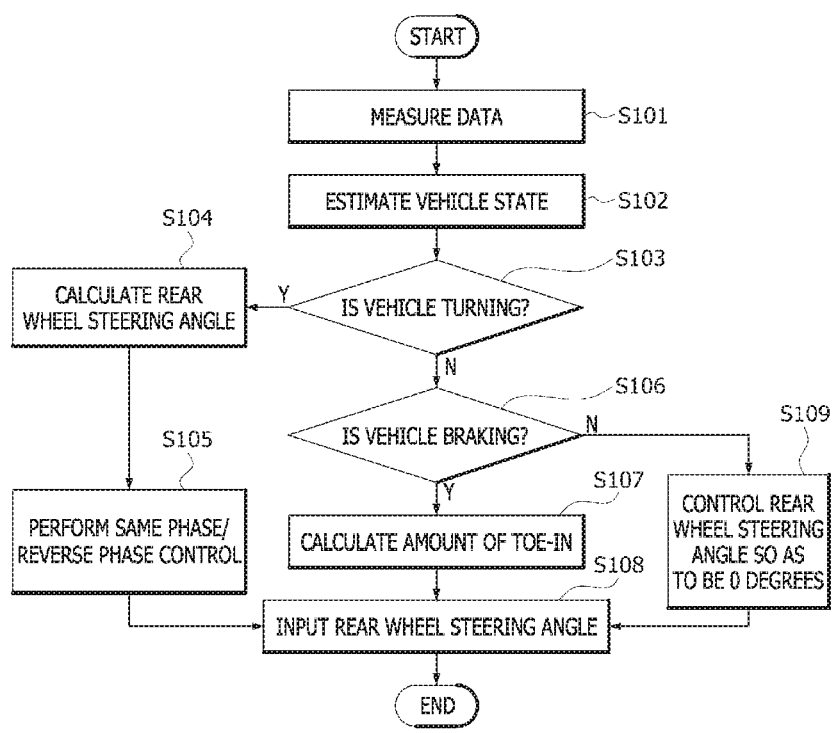
FIG. 2 is a flowchart for explaining a method for controlling rear wheel steering in accordance with an embodiment of the present invention.

FIG. 2 is a flowchart for explaining a method for controlling RWS in accordance with an embodiment of the present invention.

At step S101, the controller 140 measures (or detects) data that is necessary in order to estimate vehicle states, to compensate for a yaw rate, and to determine whether the vehicle is driving straight ahead or turning.

For example, the controller 140 continuously measures (or detects) the data of at least one sensor installed in the vehicle. For example, the data includes the steering angles and the steering angular velocities of a front wheel and a rear wheel, a wheel speed, a yaw rate, and lateral acceleration data.

The controller 140 estimates (or calculates) the vehicle states at step S102 using the measured (or detected) data.

For example, the controller 140 estimates (or calculates) the vehicle states, such as the longitudinal speed, the lateral speed, the side slip angle, the yaw rate, the lateral acceleration, and the like of the vehicle, using the measured (or detected) data.

For reference, because the use of the yaw rate and the lateral acceleration data measured (or detected) at step S101 may slow down the response when the RWS system is controlled, the RWS system is controlled using the vehicle state calculated at step S102. Meanwhile, the longitudinal speed of the vehicle may be calculated using the wheel speeds of the respective wheels of the vehicle.

Also, the controller 140 determines the current driving state (e.g., turning, braking, and the like) of the vehicle at step S103 based on the estimated vehicle states.

Figure 3:
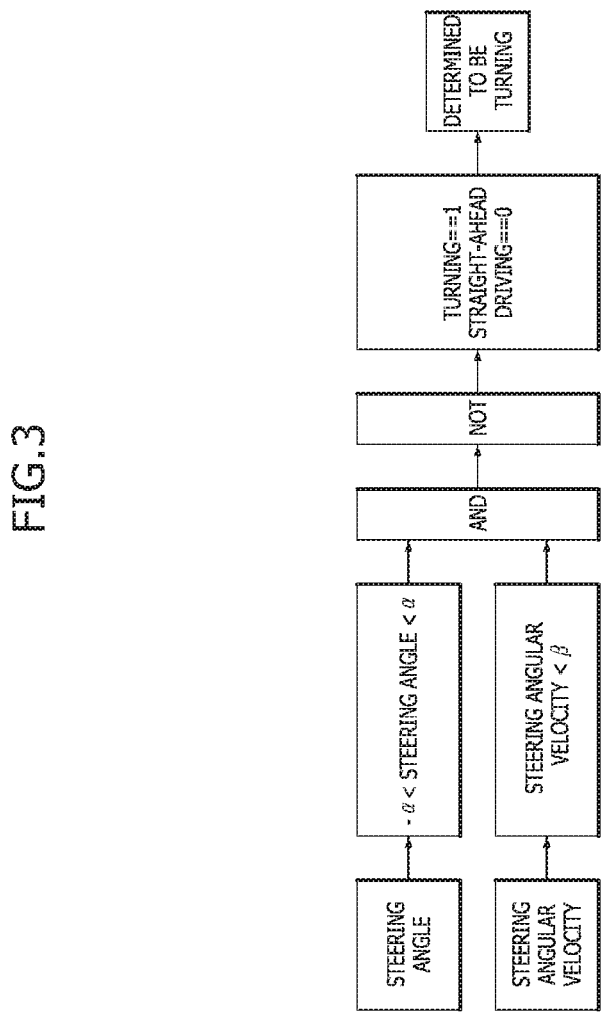
FIG. 3 is an exemplary view for more specifically explaining the method of determining the turn of a vehicle in FIG. 2.

FIG. 3 is an exemplary view for more specifically explaining the method of determining whether the vehicle is turning in FIG. 2. Referring to FIG. 3, the controller 140 determines whether the vehicle is turning using the steering angle and the steering angular velocity. More specifically, the controller 140 determines that the vehicle is driving straight ahead when the steering angle and the steering angular velocity satisfy preset AND conditions (e.g., $-\alpha<$steering angle$<\alpha$ and steering angular velocity$<\beta$), but determines that the vehicle is turning when the preset AND conditions are not satisfied.

Here, the values for determining whether the vehicle is turning or driving straight ahead (e.g., turning==1, driving straight ahead==0) may be interchangeable, and $\alpha$ and $\beta$ are kind of reference values for determining the conditions, and may be changed depending on the type (or characteristics) of the vehicle.

When the current driving state of the vehicle (e.g., turning, braking, or the like) is determined to be turning (Yes at step S103), the controller 140 calculates the rear wheel steering angle to be controlled in response to turning at step S104.

Figure 4:
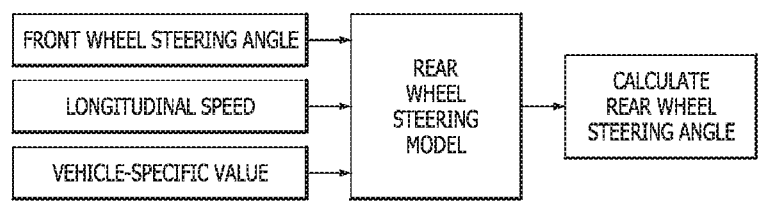
FIG. 4 is an exemplary view for more specifically explaining the method of calculating a rear wheel steering angle in response to the turn of a vehicle in FIG. 2.

FIG. 4 is an exemplary view for more specifically explaining the method of calculating the rear wheel steering angle in response to the turn of the vehicle in FIG. 2. Referring to FIG. 4, the controller 140 calculates the rear wheel steering angle required in the vehicle using the longitudinal speed of the vehicle, the front wheel steering angle, and vehicle-specific values, which are estimated (or calculated) at step S102.

Here, the vehicle-specific values include the mass of the vehicle, cornering stiffness, a distance from the center of mass of the vehicle to the tire base, a side slip angle, and the like. Also, in FIG. 4, the rear wheel steering model that is used to calculate the rear wheel steering angle using the front wheel steering angle, the longitudinal speed of the vehicle, and the vehicle-specific values means a preset equation.

Also, the controller 140 performs same phase control or reverse phase control for determining the direction of the rear wheels at step S105 after the rear wheel steering angle is determined.

Here, the same phase control corresponds to the case in which the front wheel steering angle and the rear wheel steering angle of the vehicle are in the same direction, and the reverse phase control corresponds to the case in which the front wheel steering angle and the rear wheel steering angle are in opposite directions.

Figure 5:
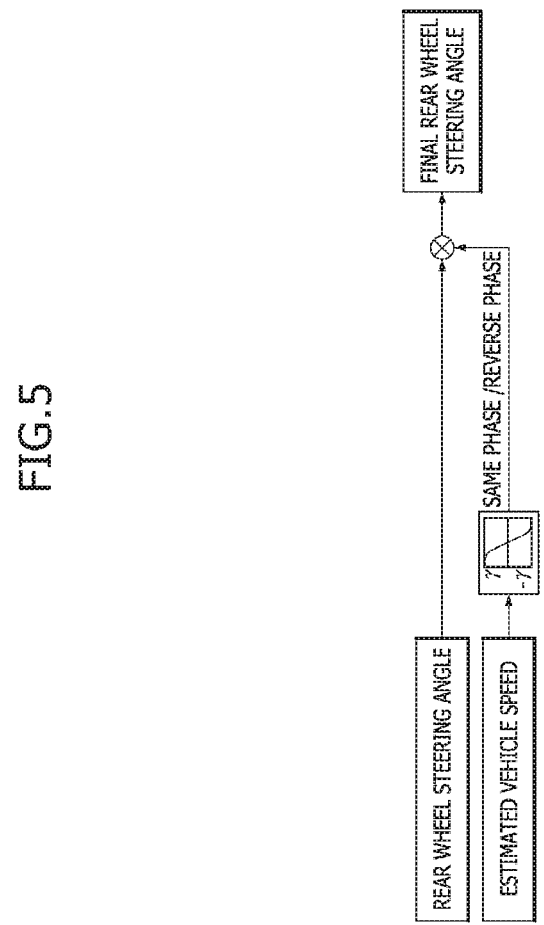
FIG. 5 is an exemplary view for more specifically explaining the method of performing same phase control or reverse phase control depending on a vehicle speed in FIG. 2.

FIG. 5 is an exemplary view for more specifically explaining the method of performing same phase control or reverse phase control depending on the vehicle speed in FIG. 2. Referring to FIG. 5, the controller 140 improves the turning performance of the vehicle by performing reverse phase control when the vehicle drives at a low speed, and the controller 140 performs same phase control in order to improve the stability of the vehicle when the vehicle drives at a high speed.

Here, whether to perform same phase control or reverse phase control is determined based on the vehicle speed, and the reference vehicle speed may be arbitrarily set based on a test result. The same phase control or the reverse phase control is performed by changing a control input sign based on the vehicle.

Accordingly, the controller 140 determines same phase control or reverse phase control depending on the estimated vehicle speed (that is, a vehicle speed calculated by calibrating the actual vehicle speed) in addition to the rear wheel steering angle, whereby the final rear wheel steering angle may be calculated when the vehicle is turning.

Meanwhile, when the current driving state of the vehicle does not correspond to turning of the vehicle (No at step S103), the controller 140 determines at step S106 whether the current driving state of the vehicle corresponds to braking of the vehicle.

That is, when the current driving state of the vehicle does not correspond to turning of the vehicle (that is, when it is determined that the vehicle is driving straight ahead), whether the vehicle is braking is determined depending on whether the braking force is generated while the vehicle is driving straight ahead, and rear wheel steering control is performed based thereon.

Figure 6:
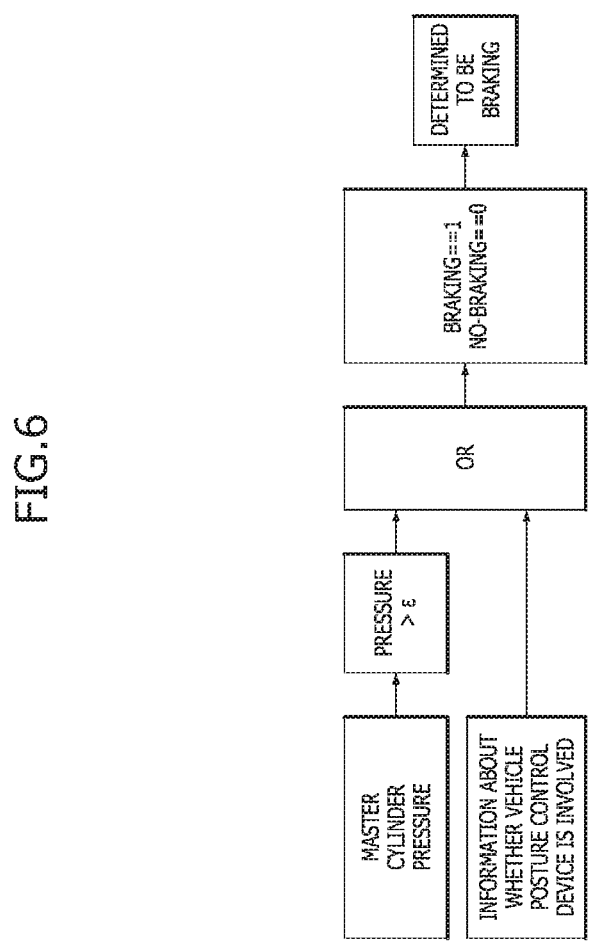
FIG. 6 is an exemplary view for more specifically explaining the method of determining whether a vehicle is braking in FIG. 2.

FIG. 6 is an exemplary view for more specifically explaining the method of determining whether the vehicle is braking in FIG. 2. Referring to FIG. 6, the controller 140 detects a master cylinder pressure (that is, the master cylinder pressure generated when a brake is applied) and determines that the vehicle is braking when the master cylinder pressure is greater than a preset reference value (e.g., ε) or when a vehicle posture control device (e.g., an ABS system, a TCS system) is involved.

When the current driving state of the vehicle is determined to be braking of the vehicle (Yes at step S106) as described above, the controller 140 calculates the amount of toe-in at step S107.

Figure 7:
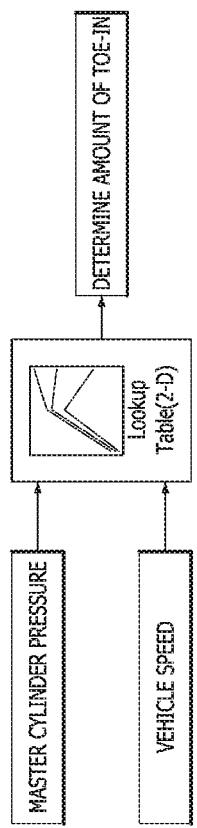
FIG. 7 is an exemplary view for more specifically explaining the method of calculating the amount of toe-in when a vehicle is braking in FIG. 2.

FIG. 7 is an exemplary view for more specifically explaining the method of calculating the amount of toe-in when the vehicle is braking in FIG. 2. Referring to FIG. 7, the controller 140 determines the amount of toe-in using a lookup table that is preset based on the master cylinder pressure, which is generated when a brake is applied, and on the vehicle speed information.

For example, the amount of toe-in is determined using a lookup table in which the amount of toe-in is preset based on whether the vehicle speed is low or high or on whether the master cylinder pressure is low or high.

For reference, the apparatus for controlling standalone-type RWS according to the present embodiment separately applies control inputs for left rear wheel steering control and right rear wheel steering control in order to improve the straight-ahead driving stability of a vehicle when the vehicle is braking while driving straight ahead. That is, through independent control of the left rear wheel and the right rear wheel, the rear wheel steering angles follow toe-in control (as shown in FIG. 8), and thus the lateral force at the rear wheel tires is moved in an inward direction, whereby the straight-ahead driving stability of the vehicle is improved.

Here, the toe-in control of the rear wheel tires is configured to determine the amount of toe-in depending on the vehicle speed and the master cylinder pressure, as shown in FIG. 7.

Figure 8:
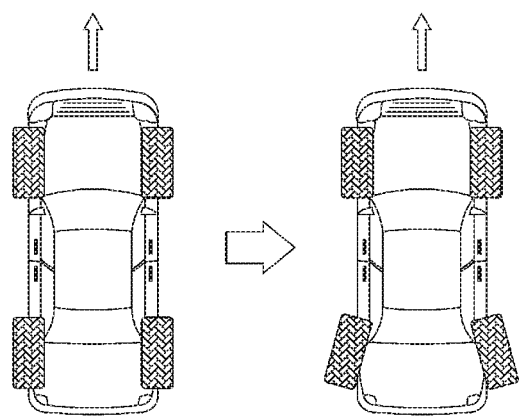
FIG. 8 is an exemplary view illustrating toe-in control of rear wheel tires when a vehicle is braking while driving straight ahead in FIG. 7.

FIG. 8 is an exemplary view illustrating the toe-in control of the rear wheel tires when the vehicle is braking while driving straight ahead in FIG. 7. As shown in the drawing, the steering angles of the left rear wheel and the right rear wheel are controlled in an inward direction, in which case the left and right rear wheel steering angles may be separately controlled.

Meanwhile, when the vehicle is driving straight ahead without braking (No at step S106), because rear wheel steering control may adversely affect the straight-ahead driving stability and the behavior of the vehicle, the steering angle control inputs for the left and right rear wheels are determined to be 0 degrees at step S109.

After the steering angles of the left and right rear wheels are calculated when the vehicle is turning, braking, or driving straight ahead, the controller 140 delivers the steering angles for finally controlling the left and right rear wheels to the RWS 150 (that is, the RWS actuator) as the control input thereof at step S108.

As described above, the present embodiment enables lateral force at wheels to move in an inward direction through toe-in control of both the left rear wheel and the right rear wheel when a vehicle is braking while driving straight ahead, thereby improving the straight-ahead driving stability of the vehicle at the time of braking. Also, when the vehicle is turning, the rear wheels are changed so as to have the same phase or a reverse phase relative to the direction of front wheels depending on a driving state detected using a sensor, whereby the turning stability and follow-up performance of the vehicle may be improved.

According to one aspect of the present invention, the present invention has an effect of improving the straight-ahead driving stability of a vehicle at the time of braking by moving lateral force at rear wheels in an inward direction through toe-in control of left and right rear wheels when the vehicle is braking while driving straight ahead.

Also, the present invention has an effect of improving the turning stability and follow-up performance of a vehicle by changing rear wheels so as to have the same phase or a reverse phase relative to the direction of front wheels depending on a driving state detected using a sensor when the vehicle is turning.

Although preferred embodiments of the invention have been disclosed for illustrative purposes, those skilled in the art will appreciate that various modifications, additions and substitutions are possible, without departing from the scope and spirit of the invention as defined in the accompanying claims. Accordingly, the scope of the present invention shall be determined only according to the attached claims.

What is claimed is:

1. An apparatus for controlling a standalone-type rear wheel steering, comprising:
   a vehicle speed detection unit configured to detect a vehicle speed by communicating with a sensor installed in a vehicle or with an Electronic Control Unit (ECU);
   a steering angle and steering angular velocity detection unit configured to detect steering angles and steering angular velocities of a front wheel and a rear wheel of the vehicle by communicating with a sensor installed in the vehicle or with the ECU;
   a master cylinder pressure detection unit configured to detect a master cylinder pressure by communicating with a sensor installed in the vehicle or with the ECU; and a controller configured to:
  determine braking or turning of the vehicle using pieces of information detected by itself using at least one of the sensors or received from the ECU,
  calculate an amount of toe-in based on the master cylinder pressure and the vehicle speed detected respectively by communicating with at least one of the sensors or with the ECU when the vehicle is braking,
  calculate a rear wheel steering angle when the vehicle is turning, and to
  control rear wheel steering depending on the calculated amount of toe-in or the calculated rear wheel steering angle.

2. The apparatus of claim 1, wherein the apparatus is configured to perform toe-in control by applying separate control inputs for left rear wheel steering control and right rear wheel steering control in order to improve straight-ahead driving stability of the vehicle when the vehicle is braking while driving straight ahead.

3. A control method of an apparatus for controlling a standalone-type rear wheel steering, the method comprising:
  detecting, by a controller of the apparatus for controlling the standalone-type rear wheel steering, data that is necessary in order to estimate a vehicle state, to compensate for a yaw rate, and to determine whether a vehicle is driving straight ahead or turning;
  estimating, by the controller, the vehicle state using the detected data;
  determining, by the controller, a current driving state of the vehicle based on the estimated vehicle state;
  calculating, by the controller, a rear wheel steering angle to be controlled in response to turning when it is determined that the vehicle is turning as a result of determination of the current driving state of the vehicle;
  performing, by the controller, same phase control or reverse phase control in order to determine a direction of rear wheels after the rear wheel steering angle is determined;
  determining, by the controller, whether the vehicle is braking while driving straight ahead when it is determined that the current driving state of the vehicle does not correspond to turning;
  calculating, by the controller, an amount of toe-in based on a master cylinder pressure and a vehicle speed detected respectively by communicating with one or more sensors installed in the vehicle or with an Electronic Control Unit (ECU) when it is determined that the current driving state of the vehicle corresponds to braking while driving straight ahead; and
  controlling, by the controller, rear wheel steering depending on the calculated amount of toe-in or the calculated rear wheel steering angle.

4. The control method of claim 3, further comprising determining, by the controller, steering angle control inputs of both left and right rear wheels to be 0 degrees when it is determined that the vehicle is driving straight ahead without braking.

5. The control method of claim 3, wherein the data that is necessary in order to compensate for the yaw rate and determine whether the vehicle is driving straight ahead or turning includes at least one of steering angles and steering angular velocities of a front wheel and a rear wheel, a wheel speed, the yaw rate, and lateral acceleration data.

6. The control method of claim 3, wherein the vehicle state estimated by the controller includes at least one of a longitudinal speed, a lateral speed, a side slip angle, the yaw rate, and a lateral acceleration of the vehicle.

7. The control method of claim 3, wherein in order to determine whether the vehicle is turning, the controller determines whether a steering angular velocity and a steering angle satisfy preset AND conditions in which the steering angle falls within a preset range ($-\alpha<$steering angle$<\alpha$) and in which the steering angular velocity is less than a preset value $\beta$(steering angular velocity$<\beta$).

8. The control method of claim 3, wherein in order to calculate the rear wheel steering angle in response to the turning of the vehicle, the controller calculates the rear wheel steering angle that is currently required in the vehicle by applying a longitudinal speed of the vehicle, a front wheel steering angle, and a vehicle-specific value, which are previously estimated, to a rear wheel steering model,
  wherein the vehicle-specific value includes at least one of a mass of the vehicle, a cornering stiffness, a distance from a center of mass of the vehicle to a tire base, and a side slip angle, and
  wherein the rear wheel steering model is an equation that is preset in order to calculate the rear wheel steering angle.

9. The control method of claim 3, wherein the same phase control is configured to perform control such that a front wheel steering angle and the rear wheel steering angle of the vehicle are in a same direction, and
  wherein the reverse phase control is configured to perform control such that the front wheel steering angle and the rear wheel steering angle are in opposite directions.

10. The control method of claim 9, wherein whether to perform the same phase control or the reverse phase control is determined based on a preset vehicle speed.

11. The control method of claim 3, wherein in order to determine whether the vehicle is braking, the controller detects a master cylinder pressure, which is generated when a brake is applied, and determines that the vehicle is braking when the master cylinder pressure is greater than a preset reference value ($\varepsilon$) or when any one vehicle posture control device is involved.

12. The control method of claim 3, wherein, when it is determined that the vehicle is braking, the controller determines the amount of toe-in using a lookup table that is preset based on a master cylinder pressure generated when a brake is applied and on vehicle speed information.

* * * * *